US010852723B2

(12) United States Patent
Moeller et al.

(10) Patent No.: US 10,852,723 B2
(45) Date of Patent: Dec. 1, 2020

(54) UNMANNED AERIAL VEHICLE SWARM PHOTOGRAPHY

(71) Applicant: Intel IP Corporation, Santa Clara, CA (US)

(72) Inventors: Marco Moeller, St. Leon-Rot (DE); Daniel Pohl, Puchheim (DE); Tobias Gurdan, Germering (DE)

(73) Assignee: INTEL IP CORPORATION, Santa Clara, CA (US)

( * ) Notice: Subject to any disclaimer, the term of this patent is extended or adjusted under 35 U.S.C. 154(b) by 16 days.

(21) Appl. No.: 15/811,726

(22) Filed: Nov. 14, 2017

(65) Prior Publication Data

US 2019/0049945 A1    Feb. 14, 2019

(51) Int. Cl.

| G05D 1/00 | (2006.01) |
|---|---|
| B64C 39/02 | (2006.01) |
| G03B 15/00 | (2006.01) |
| H04N 7/18 | (2006.01) |
| H04N 5/225 | (2006.01) |
| G03B 37/04 | (2006.01) |
| G05D 1/10 | (2006.01) |
| H04N 5/247 | (2006.01) |
| H04N 5/232 | (2006.01) |

(52) U.S. Cl.
CPC ......... *G05D 1/0027* (2013.01); *B64C 39/024* (2013.01); *G03B 15/006* (2013.01); *G03B 37/04* (2013.01); *G05D 1/0094* (2013.01); *G05D 1/104* (2013.01); *H04N 5/225* (2013.01); *H04N 5/23206* (2013.01); *H04N 5/23218* (2018.08); *H04N 5/23222* (2013.01); *H04N 5/247* (2013.01); *H04N 7/181* (2013.01); *H04N 7/185* (2013.01); *H04N 7/188* (2013.01); *B64C 2201/127* (2013.01); *B64C 2201/146* (2013.01); *G03B 2206/00* (2013.01)

(58) Field of Classification Search
CPC .............. G08G 5/0069; B64C 2201/00; B64C 2201/12; B64C 2201/126; B64C 2201/143; B64C 39/024; B64D 47/06; G05D 1/104

See application file for complete search history.

(56) References Cited

U.S. PATENT DOCUMENTS

| 7,184,072 B1* | 2/2007 | Loewen ................. G01C 11/02 348/144 |
|---|---|---|
| 8,994,822 B2* | 3/2015 | Smitherman ...... H04N 5/23238 348/144 |
| 9,643,722 B1* | 5/2017 | Myslinski .......... G06K 9/00711 |

(Continued)

OTHER PUBLICATIONS

Gurdan Tobias, "Spatial and Temporal Interpolation of Multi-View Video", Bachelor's Thesis in Computer Science, Nov. 14, 2013, Fakultät für Informatik der Technischen Universität München.

*Primary Examiner* — Frederick D Bailey
(74) *Attorney, Agent, or Firm* — Viering, Jentschura & Partner mbB

(57) ABSTRACT

Herein is disclosed an unmanned aerial vehicle photography system comprising at least a first unmanned aerial vehicle and a second unmanned aerial vehicle; the first unmanned aerial vehicle further comprising one or more image sensors, configured to obtain a subject image of a subject; and one or more processors, configured to cause the one or more image sensors to obtain the subject image synchronously with the second unmanned aerial vehicle.

18 Claims, 8 Drawing Sheets

(56) References Cited

U.S. PATENT DOCUMENTS

| | | | |
|---|---|---|---|
| 2004/0008253 A1* | 1/2004 | Monroe | G08B 13/19641 |
| | | | 348/143 |
| 2004/0032970 A1* | 2/2004 | Kiraly | A63B 24/0021 |
| | | | 382/103 |
| 2007/0103548 A1* | 5/2007 | Carter | H04N 7/188 |
| | | | 348/143 |
| 2011/0228091 A1* | 9/2011 | Kroepfl | H04L 67/1095 |
| | | | 348/148 |
| 2011/0267460 A1* | 11/2011 | Wang | G08G 1/054 |
| | | | 348/135 |
| 2014/0028838 A1* | 1/2014 | Okur | G01S 7/4815 |
| | | | 348/139 |
| 2014/0119716 A1* | 5/2014 | Ohtomo | G01C 11/00 |
| | | | 396/8 |
| 2016/0035224 A1* | 2/2016 | Yang | H04B 7/18506 |
| | | | 701/23 |
| 2016/0247404 A1* | 8/2016 | Srivastava | G01C 21/20 |
| 2016/0351089 A1* | 12/2016 | Salem | G09F 21/12 |
| 2017/0053169 A1* | 2/2017 | Cuban | H04N 7/185 |
| 2017/0146344 A1* | 5/2017 | Clark | B64C 39/024 |
| 2017/0220037 A1* | 8/2017 | Berestov | G05D 1/0027 |
| 2017/0313416 A1* | 11/2017 | Mishra | B64C 39/024 |
| 2017/0336203 A1* | 11/2017 | Barnes | G01S 17/88 |
| 2018/0072416 A1* | 3/2018 | Cantrell | B64C 39/024 |
| 2018/0074522 A1* | 3/2018 | Cantrell | G05D 1/0027 |
| 2018/0101169 A1* | 4/2018 | Applewhite | B64F 1/04 |

\* cited by examiner

UNMANNED AERIAL VEHICLE SWARM PHOTOGRAPHY

TECHNICAL FIELD

Various aspects of the disclosure relate generally to 3D image reconstruction using images obtained from a synchronized swarm of unmanned aerial vehicles ("UAV").

BACKGROUND 3D images may be constructed by processing a plurality of images of the same subject, wherein the images are taken from a plurality of perspectives. Where a subject is stationary, a single UAV may travel around the subject and take a plurality of pictures from various vantage points. These images can be reconstructed into a three-dimensional image. Where the subject is not stationary, however, the quality of the final three-dimensional image taken in this manner will be diminished.

SUMMARY

Herein is disclosed an unmanned aerial vehicle photography system including at least a first unmanned aerial vehicle and a second unmanned aerial vehicle; the first unmanned aerial vehicle further including one or more image sensors, configured to obtain a subject image of a subject; and one or more processors, configured to cause the one or more image sensors to obtain the subject image synchronously with the second unmanned aerial vehicle.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

Figure 1:
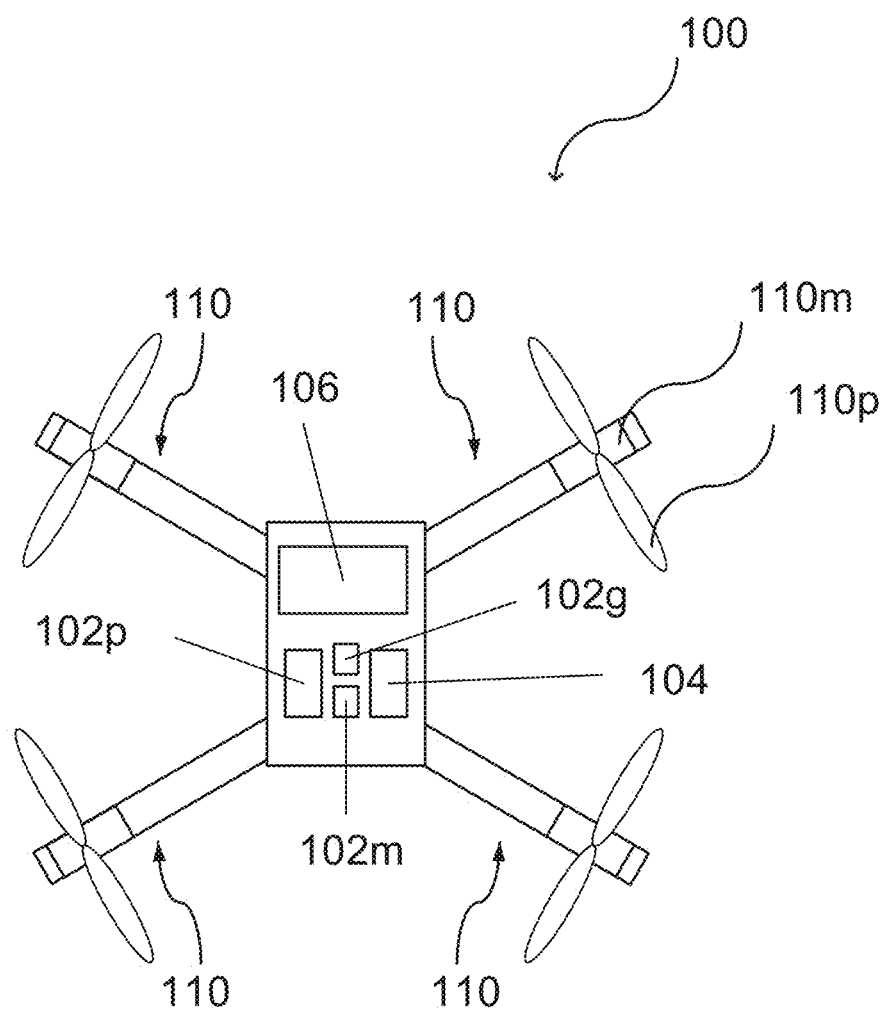
FIG. 1 shows a UAV according to one aspect of the disclosure.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration." Any example or design described herein as "exemplary" is not necessarily to be construed as preferred or advantageous over other examples or designs.

Throughout the drawings, it should be noted that like reference numbers are used to depict the same or similar elements, features, and structures.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "position" used with regard to a "position of an unmanned aerial vehicle", "position of an object", "position of an obstacle", and the like, may be used herein to mean a point or region in a two- or three-dimensional space. It is understood that suitable coordinate systems with respective reference points are used to describe positions, vectors, movements, and the like.

The term "map" used with regard to a two- or three-dimensional map may include any suitable way of describing positions of objects in the two- or three-dimensional space.

According to various aspects, a voxel map may be used to describe objects in the three dimensional space based on voxels associated with objects. To prevent collision based on a voxel map, ray-tracing, ray-casting, rasterization, etc., may be applied to the voxel data.

An unmanned aerial vehicle (UAV) is an aircraft that has the capability of autonomous flight. In autonomous flight, a human pilot is not aboard and in control of the unmanned aerial vehicle. The unmanned aerial vehicle may also be denoted as unstaffed, uninhabited or unpiloted aerial vehicle, -aircraft or -aircraft system or drone.

The unmanned aerial vehicle, according to various aspects, may include a support frame that serves as basis for mounting components of the unmanned aerial vehicle, as for example, motors, sensors, mechanic, transmitter, receiver, and any type of control to control the functions of the unmanned aerial vehicle as desired.

FIG. 1 illustrates an unmanned aerial vehicle 100 in a schematic view, according to various aspects of the disclosure. The unmanned aerial vehicle 100 may include a plurality of (e.g., three or more than three, e.g., four, six, eight, etc.) vehicle drive arrangements 110. Each of the vehicle drive arrangements 110 may include at least one drive motor 110$m$ and at least one propeller 110$p$ coupled to the at least one drive motor 110$m$. The one or more drive motors 110$m$ of the unmanned aerial vehicle 100 may be electric drive motors.

Further, the unmanned aerial vehicle 100 may include one or more processors 102$p$ configured to control flight or any other operation of the unmanned aerial vehicle 100 including but not limited to navigation, image analysis, location calculation, and any method or action described herein. One or more of the processors 102$p$ may be part of a flight controller or may implement a flight controller. The one or more processors 102$p$ may be configured, for example, to provide a flight path based at least on an actual position of the unmanned aerial vehicle 100 and a desired target positon for the unmanned aerial vehicle 100. In some aspects, the one or more processors 102$p$ may control the unmanned aerial vehicle 100. In some aspects, the one or more processors 102$p$ may directly control the drive motors 110$m$ of the unmanned aerial vehicle 100, so that in this case no additional motor controller may be used. Alternatively, the one or more processors 102$p$ may control the drive motors 110$m$ of the unmanned aerial vehicle 100 via one or more additional motor controllers. The one or more processors 102$p$ may include or may implement any type of controller suitable for controlling the desired functions of the unmanned aerial vehicle 100. The one or more processors 102$p$ may be implemented by any kind of one or more logic circuits.

According to various aspects, the unmanned aerial vehicle 100 may include one or more memories 102$m$. The one or more memories may be implemented by any kind of one or more electronic storing entities, e.g. a one or more volatile memories and/or one or more non-volatile memories. The one or more memories 102$m$ may be used, e.g., in interaction with the one or more processors 102$p$, to build and/or store image data, ideal locations, locational calculations, or alignment instructions.

Further, the unmanned aerial vehicle 100 may include one or more power supplies 104. The one or more power supplies 104 may include any suitable type of power supply, e.g., a directed current (DC) power supply. A DC power supply may include one or more batteries (e.g., one or more rechargeable batteries), etc.

According to various aspects, the unmanned aerial vehicle 100 may include one or more sensors 106. The one or more sensors 106 may be configured to monitor a vicinity of the unmanned aerial vehicle 100. The one or more sensors 106 may be configured to detect obstacles in the vicinity of the unmanned aerial vehicle 100. The one or more sensors 106 may include, for example and without limitation, one or more cameras (e.g., a still camera, a video camera, a conventional color camera, a depth camera, a stereo camera, a thermal imaging camera, etc.), one or more ultrasonic sensors, etc. The unmanned aerial vehicle 100 may further include a position detection system 102g. The position detection system 102g may be based, for example, on Global Positioning System (GPS) or any other available positioning technology. Therefore, the one or more processors 102p may be further configured to modify the flight path of the unmanned aerial vehicle 100 based on data obtained from the position detection system 102g. The sensors 106 may be mounted as depicted herein, or in any other configuration suitable for an implementation.

According to various aspects, the one or more processors 102p may include at least one transceiver configured to provide an uplink transmission and/or downlink reception of radio signals including data, e.g. video or image data and/or commands. The at least one transceiver may include a radio frequency (RF) transmitter and/or a radio frequency (RF) receiver.

The one or more processors 102p may further include an inertial measurement unit (IMU) and/or a compass unit. The inertial measurement unit may allow, for example, a calibration of the unmanned aerial vehicle 100 regarding a predefined plane in a coordinate system, e.g., to determine the roll and pitch angle of the unmanned aerial vehicle 100 with respect to the gravity vector (e.g. from planet earth). Thus, an orientation of the unmanned aerial vehicle 100 in a coordinate system may be determined. The orientation of the unmanned aerial vehicle 100 may be calibrated using the inertial measurement unit before the unmanned aerial vehicle 100 is operated in flight modus. However, any other suitable function for navigation of the unmanned aerial vehicle 100, e.g., for determining a position, a flight velocity, a flight direction, etc., may be implemented in the one or more processors 102p and/or in additional components coupled to the one or more processors 102p.

Figure 2:
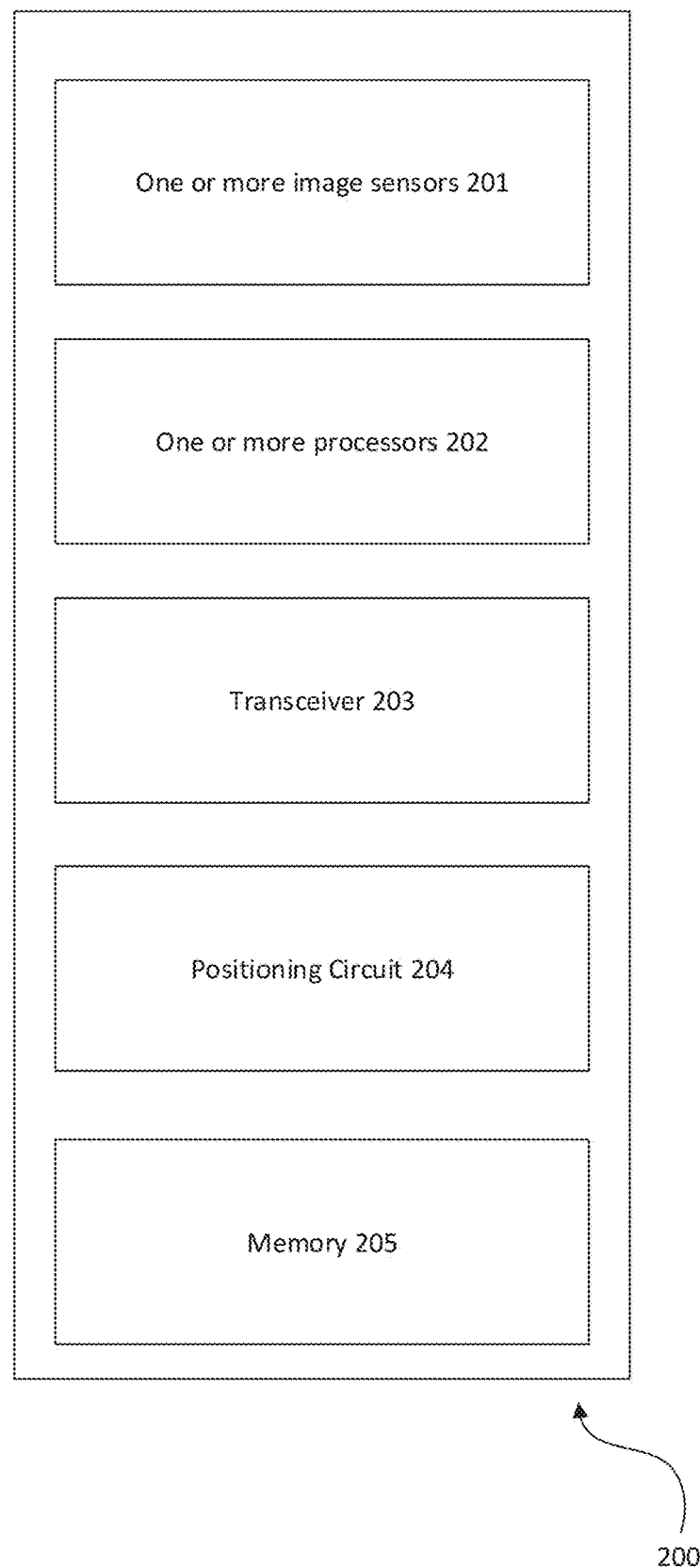
FIG. 2 shows a system for synchronized UAV swarm photography.

In FIG. 2 is shown a unmanned aerial vehicle photography system 200 at least a first unmanned aerial vehicle and a second unmanned aerial vehicle; the first unmanned aerial vehicle further including one or more image sensors 201, configured to obtain a subject image of a subject; and one or more processors 202, configured to cause the one or more image sensors to obtain the subject image synchronously with the second unmanned aerial vehicle. One or more unmanned aerial vehicles in the unmanned aerial vehicle photography system may further include any of a transceiver 203, configured to receive the trigger instruction; a positioning circuit 204, configured to determine a position of the first unmanned aerial vehicle; and a memory 205, configured to store at least one of a trigger instruction, the subject image, or a position of the first unmanned aerial vehicle.

Figure 3:
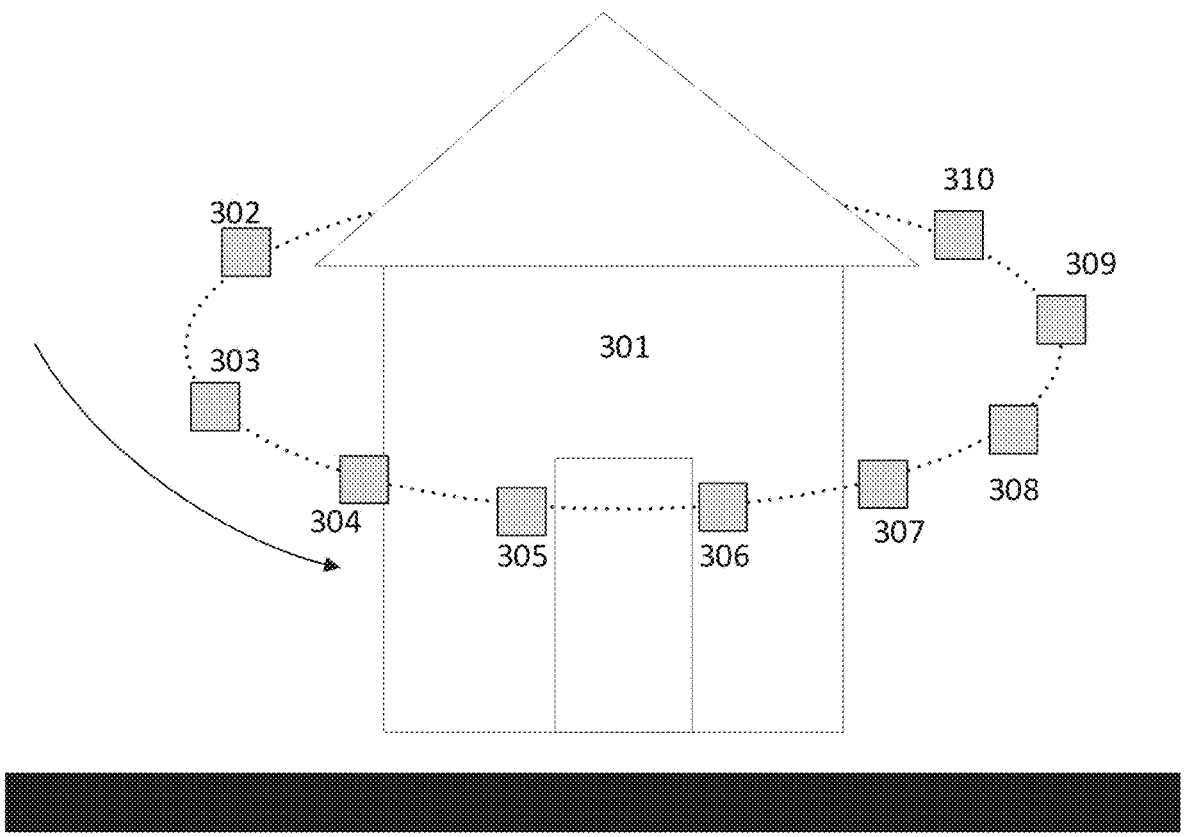
FIG. 3 shows a known method of a single UAV circum-flying a subject for 3D image re-creation.
Figure 4:
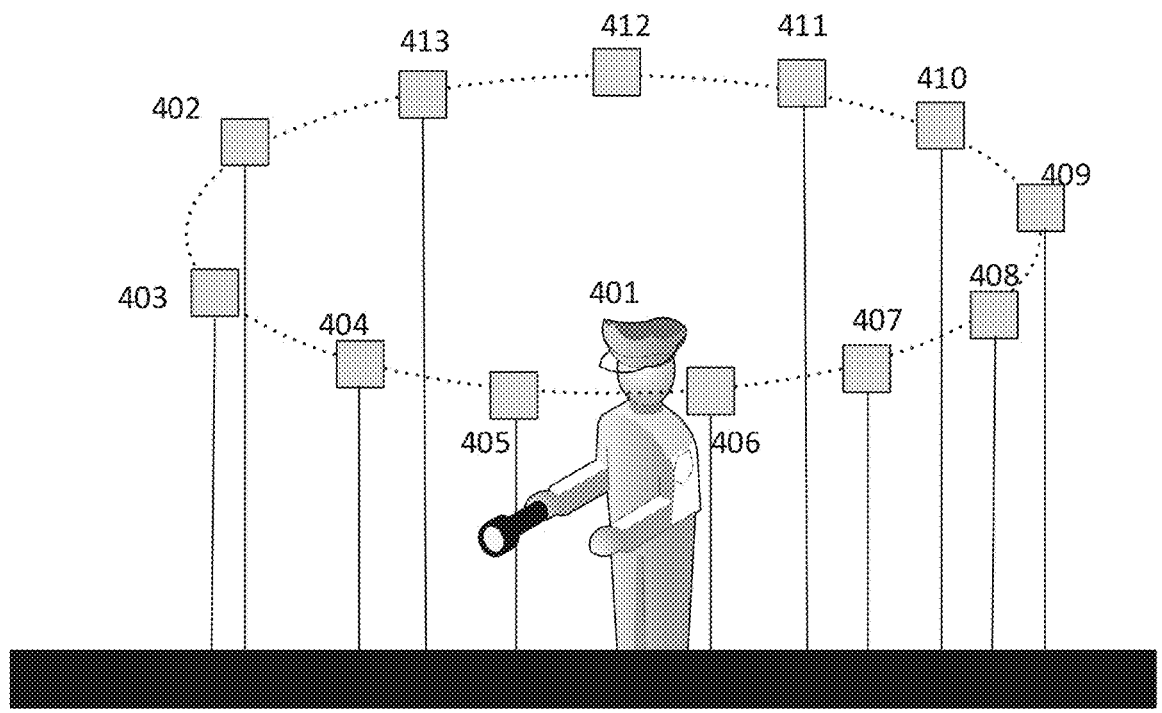
FIG. 4 shows a known method of employing ground-supported image sensors for 3D image recreation.

FIG. 3 shows a known method of photography for 3D reconstruction of a stationary object. According to this figure, the subject 301 is a stationary object, which is, in this case, a house. An unmanned aerial vehicle may be commissioned to fly in a circular or semi-circular pattern around the object, taking pictures at regular intervals. In this case, FIG. 3 depicts a single unmanned aerial vehicle encircling the subject, 301 and taking photographs at regular intervals at locations depicted as 302 through 310. These images will then be submitted to a 3D reconstruction program capable of assembling the multiple images of the subject taken from different vantage points, and constructing from these images a three-dimensional representation of the subject. Notably, because only a single unmanned aerial vehicle is used to obtain images from locations 302 through 310, the images are taken at different times and in a sequential order. Although this may be reasonably successful in certain circumstances, such as when the subject is a stationary object, this procedure may yield poor results when the subject is not stationary, or when other objects within the images are not stationary.

Where the subject is nonstationary, or is otherwise likely to locomote, or where there are otherwise moving objects within the image area, multiple images may be simultaneously taken for subsequent combination into a 3D reconstruction program. FIG. 4 shows a known method of taking multiple simultaneous images. In this case, the subject 401 is a person, and therefore unlikely to be stationary over time. An attempt to take multiple images of the subject 401 using the method shown in FIG. 3 is likely to result in a poor quality depiction of the subject 401, which may include light, hazy, or blurry representations of the subject 401. The solution to this problem has previously been to mount a plurality of image sensors in a region encircling, or partially encircling, the subject 401, and to coordinate this plurality of image sensors to take simultaneous images of the subject 401. This has required the plurality of image sensors to be rigidly affixed to a device on the ground, which may be expensive and time-consuming to configure, and which may allow limited flexibility for adjustments. FIG. 4 shows a plurality of image sensors 402 through 413 encircling the subject 401, wherein the plurality of image sensors 402 through 413 are rigidly affixed on stands.

Figure 5:
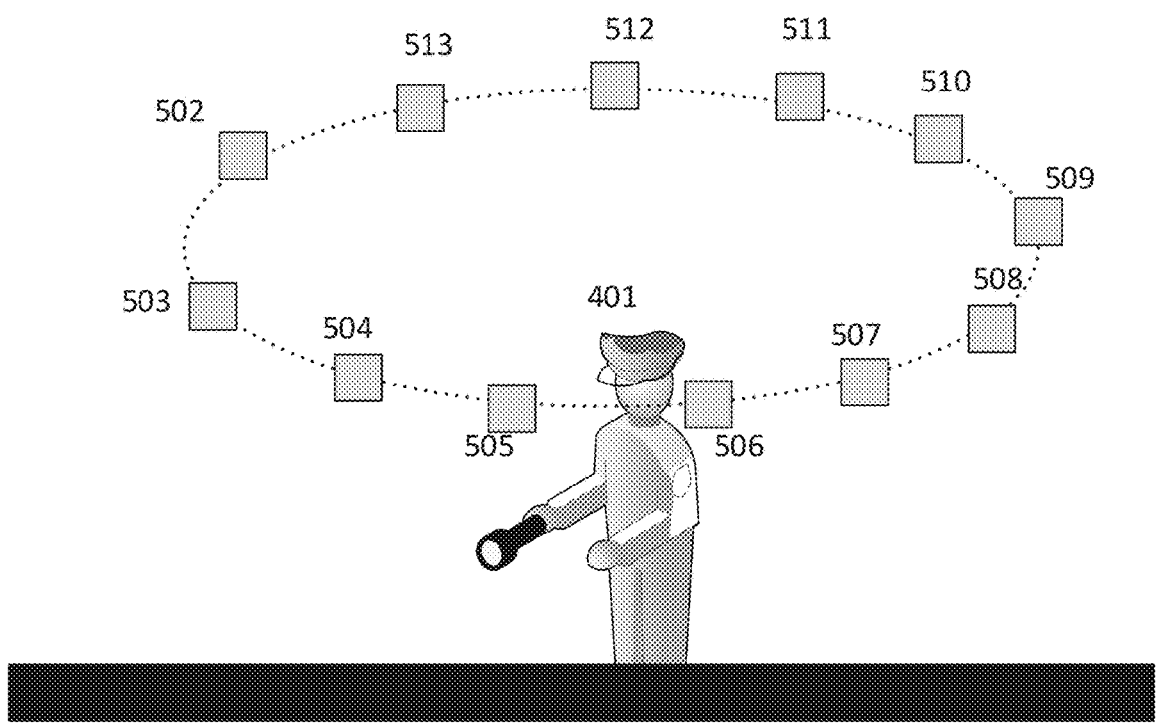
FIG. 5 shows synchronized UAV swarm photography according to one aspect of the disclosure.

FIG. 5 shows an unmanned aerial vehicle photography system according to one aspect of the disclosure. In this case, a swarm of unmanned aerial vehicles 502 through 513 are commissioned to take simultaneous images of the subject 401. Because the plurality of unmanned aerial vehicles are capable of flight within a three-dimensional space, they need not be affixed to, or otherwise supported by, the ground. This provides significant improvement in flexibility and set up compared to ground-mounted image sensors. Each unmanned aerial vehicle is equipped with at least one image sensor and is directed to obtain an image of the subject 401. The subject may be identified in terms of absolute location, region, or otherwise, and the plurality of unmanned aerial vehicles 502 through 513 encircle the subject and obtain at least one synchronized image. The result is an image of the subject 401 from the vantage point of each of the plurality of unmanned aerial vehicles. This plurality of simultaneously-taken images is then transmitted to a 3D reconstruction software, which creates a 3D model of the subject 401 using the plurality of images obtained from the plurality of unmanned aerial vehicles. In FIG. 5, the unmanned aerial vehicles are depicted in a circular formation; however, the unmanned aerial vehicles may be located in a variety of formations including, but not limited to, a semi-circle, a half-circle, or an arc.

Depending on the formation of the unmanned aerial vehicles and the height of the unmanned aerial vehicles relative to the subject, one or more unmanned aerial vehicles (such as those across from an image-taking unmanned aerial vehicle) may be included in a camera image, which may require editing. In this case, the programmed locations of the unmanned aerial vehicles may be stored such that they will be more rapidly discernable for removal and/or retouching in post-production.

Figure 6:
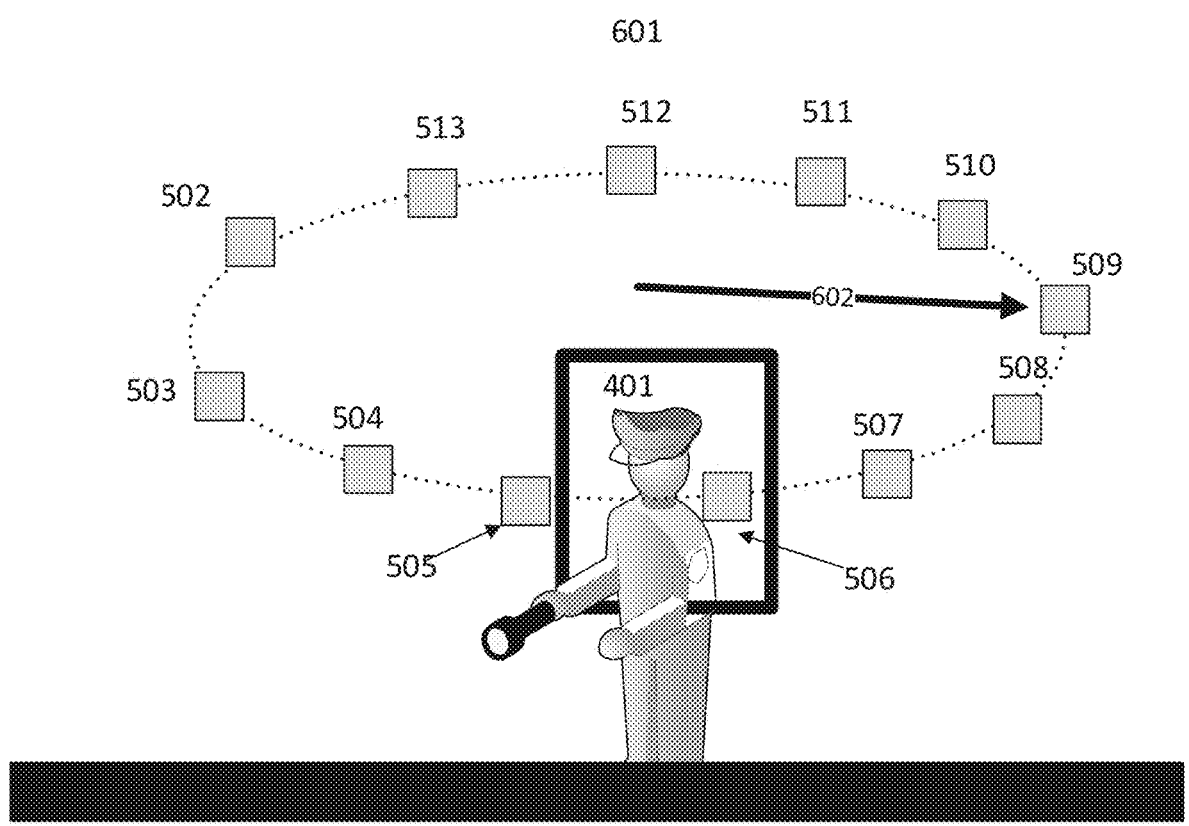
FIG. 6 shows identification of the subject and image distance for synchronized UAV swarm photography.

FIG. 6 shows a positioning determination according to one aspect of the disclosure. In this case, the plurality of unmanned aerial vehicles 502 through 513 are commissioned to obtain a plurality of simultaneously-taken images of the subject 401. The subject 401 in this case is identified by a region of interest 601. The region of interest 601 may be programmed as an absolute location, such as a location pursuant to a Global Positioning System; a point defined by, for example, coordinates on x, y, and z axes; a region defined by coordinates on x, y, and z axes; or a region defined by one or more distances from the subject 401. The one or more unmanned aerial vehicles may be further configured to take synchronized images of the subject 401 from an image distance 602, which may be any distance defined from the subject 401. According to one aspect of the disclosure, the one or more unmanned aerial vehicles will be instructed to take synchronized images of the subject 401 from a predetermined distance from the subject, known as the image distance 602, wherein the one or more unmanned aerial vehicles will encircle the subject 401 and maintain a radius of the image distance 602 from the subject 401.

Figure 7:
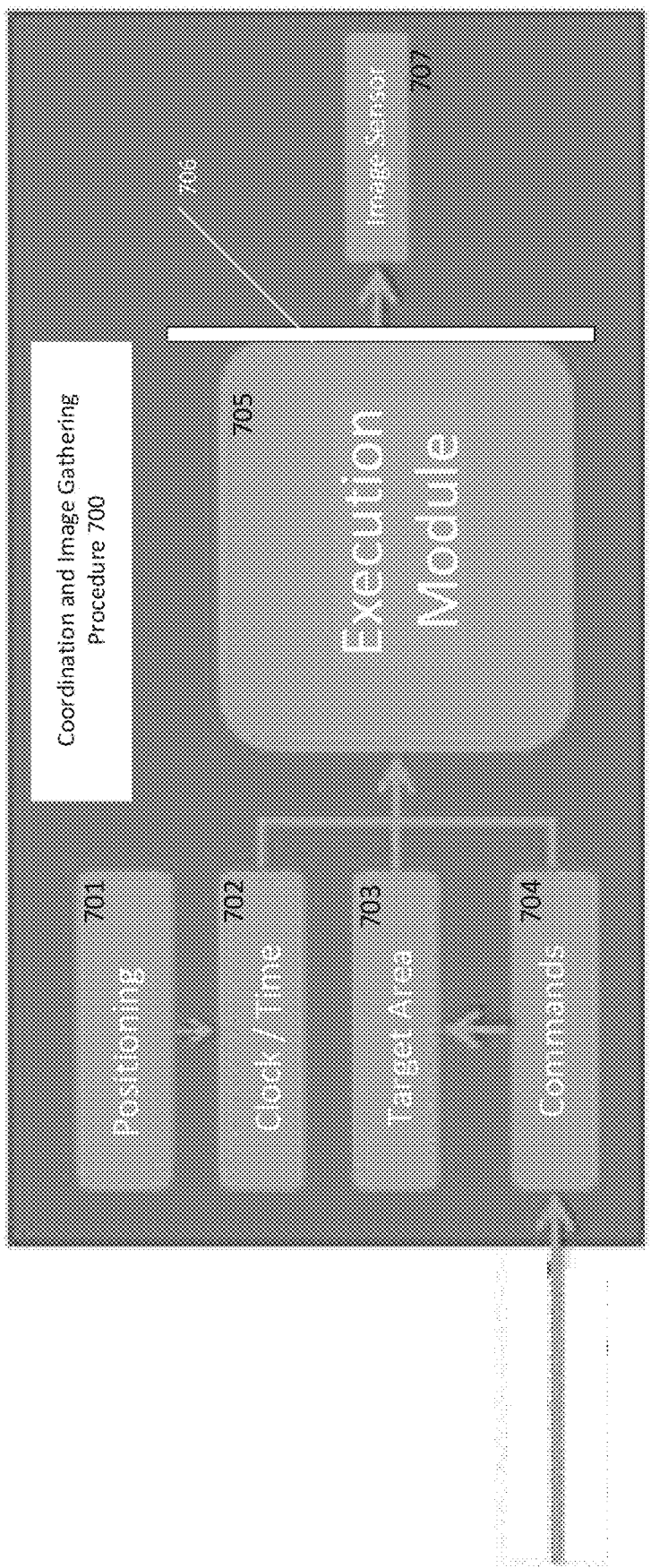
FIG. 7 shows a procedural diagram for UAV swarm photography.

FIG. 7 shows a coordination and image gathering procedure 700 for the unmanned aerial vehicle photography system. According to one aspect of the disclosure, the unmanned aerial vehicle may be equipped with a positioning circuit 701 configured to obtain a position of the unmanned aerial vehicle. The positioning circuit 701 may obtain a position through connection to a Global Positioning System or to a radio access technology, such as, but not limited to, LTE, 5G, or WLAN. In the event that the Global Positioning System is used, the UAV can perform a highly accurate synchronization of the clock 702, to coordinate image taking with the remaining unmanned aerial vehicles. This is made possible at least by the transmission of a clock time during the Global Positioning Synchronization phase. A plurality of unmanned aerial vehicles may connect to the Global Positioning System and thereby obtain a synchronized clock within a tolerance in excess of that required for successful image reconstruction according to the methods described herein. Acceptable clock synchronization can also be achieved through a radio access technology, including, but not limited to Network Timing Protocols, whether by LTE, 5G, WLAN, or otherwise. The UAV is equipped with a transceiver to receive commands 704, which may include the object for a synchronized image. The command 704 may be a timing to obtain the image, a location for the image, a vantage point for the image, or any combination of the foregoing. Upon receiving the commands, the unmanned aerial vehicle travels to a target area 703, which is the area from which UAV will view and photograph the object. The UAV will then enter an execution mode 705, in which the UAV is prepared to take an image with its one or more sensors. A trigger event 706 is an event that will cause the one or more processors to trigger the taking of an image. According to one aspect of the disclosure, and trigger event 706 will cause the one or more processors to activate the image sensor 707 for receipt of an image within a predetermined period following the trigger event. That is, because image taking is synchronized between a plurality of UAVs, and because a trigger event 706 may not be received at the same time by each member of the UAV swarm, a predetermined period following a trigger event may allow for asynchronous receipt of a trigger event followed by synchronous image taking. For example, the plurality of UAVs may be configured to obtain an image at the conclusion of the first full second following receipt of the trigger event, according to the trigger instruction.

In addition to the positioning method/systems mentions above, the positioning circuit 701 may be configured to use Real Time Kinematic satellite navigation. Real Time Kinematic satellite navigation is a method that is used to improve or enhance the precision of data that is obtained from one or more positioning systems, such as, but not limited to, the Global Positioning System, Global Navigation Satellite System, Galileo, and BeiDou. The positioning circuit 701 may be used with an ultra wideband positioning system. The positioning circuit 701 may be configured to obtain or derive positioning data using a visual system, such as simultaneous localization and mapping (SLAM).

Figure 8:
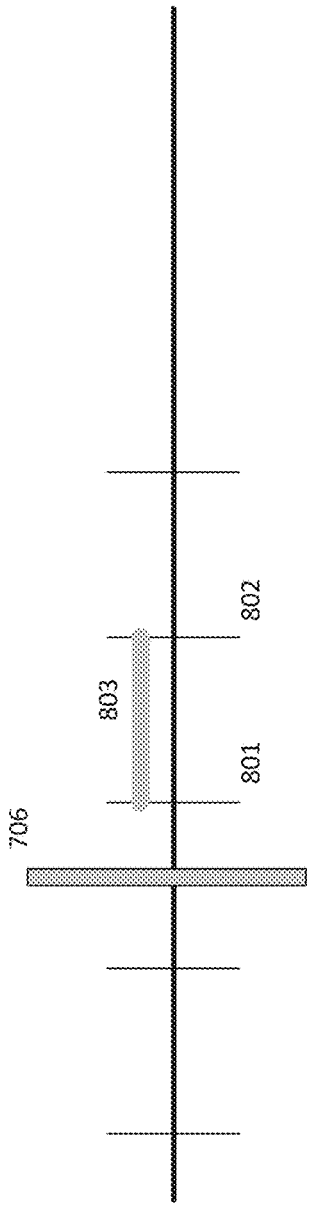
FIG. 8 shows a photography timing following a trigger event.

FIG. 8 shows a timing of synchronized image taking following a trigger event, according to one aspect of the disclosure. The horizontal line in FIG. 8 is a time continuum marked by short vertical lines indicating the beginning of seconds. In this case, the second full second depicted includes a trigger event 706, which is depicted as a wide bar to indicate a certain tolerance for receipt of the trigger event 706. That is to say, it is anticipated that, regardless of whether the trigger event is a signal or an event that must be appreciated by a sensor on the UAV, recognition of a trigger event may occur at slightly different times within the swarm of UAVs. In order to synchronize the UAVs following differently timed recognitions of a trigger event 706, one strategy according to the disclosure is to schedule a synchronized image taking following completion of a predetermined period after the beginning of a period following the trigger event. Specifically in this case, the synchronized image taking is scheduled for the completion of the first second that begins after receipt of the trigger event 706. As depicted, the first second following receipt of the trigger event 706 begins at 707. The one or more processors are programmed to take an image of the subject one second after the beginning of the first second following receipt of the trigger event. The first second beginning after the trigger event is marked as 801, and one second thereafter is marked as 802. The period between the initiation of the first second following the trigger event 801 and the time of taking an image 802 is a buffer period 803. The buffer 709 may be any period of any length sufficiently long to accommodate for slightly asynchronous receipt or appreciation of a trigger event 706.

Figure 9:
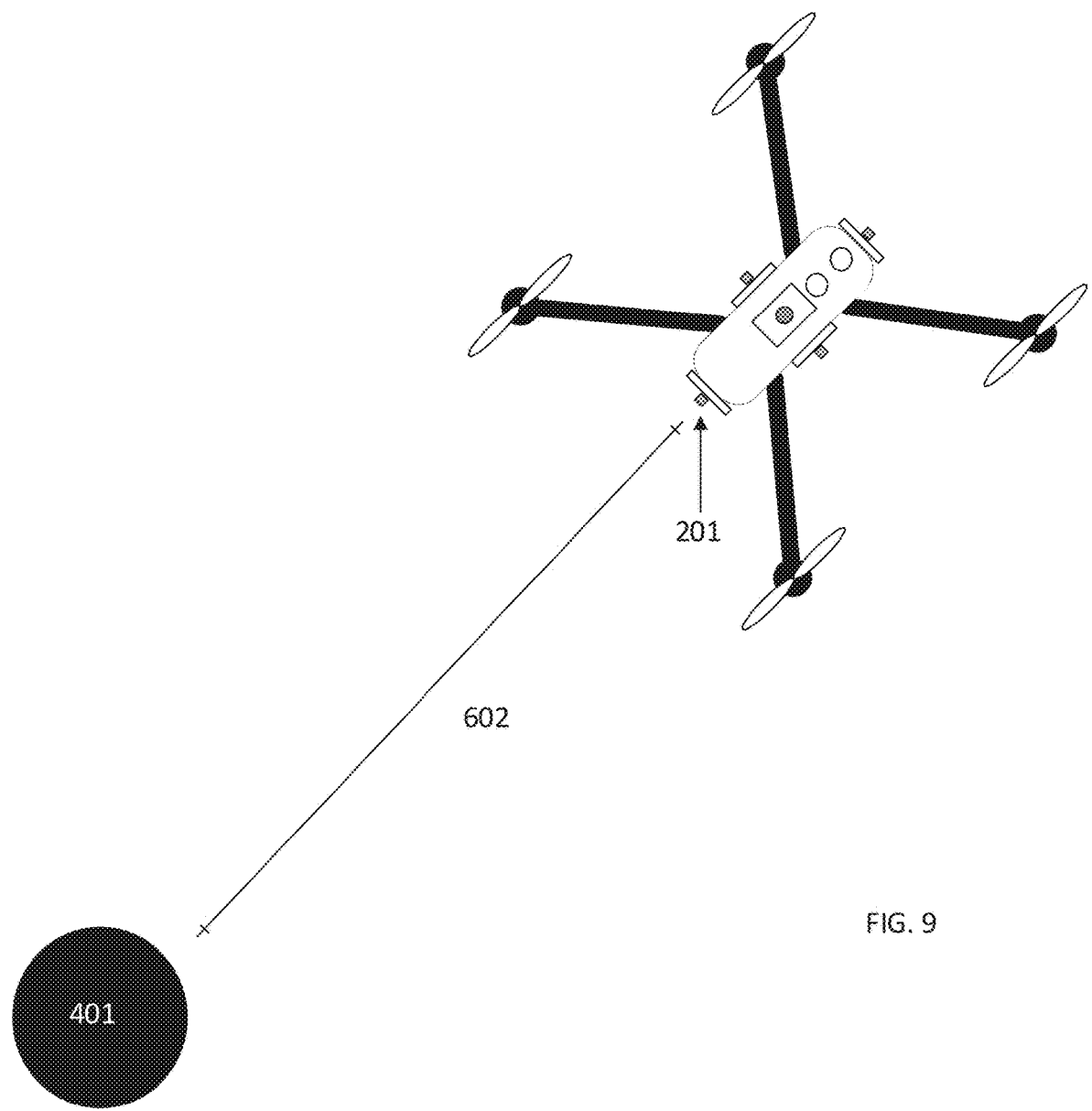
FIG. 9 shows an alignment of one or more image sensors with respect to a UAV and a subject.

FIG. 9 depicts an alignment between an image sensor and a subject. In this figure, the subject 401 is selected and communicated to the UAV. The subject may be preprogramed or may be transmitted to the UAV, such as through the transceiver. The UAV is equipped with one or more image sensors 201 which are configured to obtain an image of the subject 401. The unmanned aerial vehicle in FIG. 9 is depicted as having a plurality of image sensors 201 and are specifically located in this figure as being place in the fore, aft, starboard, port, and up directions. Additionally, an image sensor 201 may be placed in the bottom direction (not pictured). Image sensors may be placed elsewhere on the UAV, such as on supports, elsewhere on the body, or above or below a propeller. Depending on the placement of the image sensor 201, the drone may be positioned such that it is not facing the subject 401, but rather such that the relevant image sensor is positioned toward the subject 401. The UAV may be programmed with a distance 602 to maintain between the UAV and the subject 401.

Figure 10:
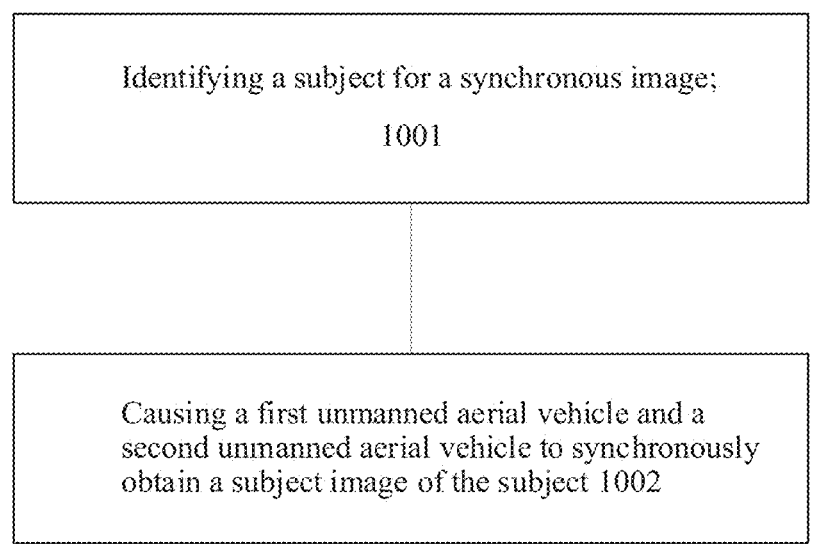
FIG. 10 shows a method for synchronized UAV swarm photography.

FIG. 10 shows a method of unmanned aerial vehicle photography including identifying a subject for a synchronous image 1001; and causing a first unmanned aerial vehicle and a second unmanned aerial vehicle to synchronously obtain a subject image of the subject 1002.

The unmanned aerial vehicle, according to various aspects, may include a camera gimbal having an independent two- or three-axes degree of freedom to properly track a target, e.g. a person or subject, with a tracking camera independently of an actual flight direction or actual attitude of the unmanned aerial vehicle. In some aspects, a depth camera may be used for tracking, monitoring the vicinity, providing images to a user of the drone, etc. A depth camera may allow associating depth information with an image, e.g., to provide a depth image. This allows, for example, providing an image of the vicinity of the unmanned aerial vehicle including depth information about one or more objects depicted in the image. As an example, a depth image may include information to indicate a relative distance of objects displayed in the image. This distance information may be, but is not limited to, colors and/or shading to depict a relative distance from a sensor. Based on depth images, a three dimensional map may be constructed from the depth information. Said map construction may be achieved using a depth map engine, which may include one or more processors or a non-transitory computer readable medium configured to create a depth map from the depth information provided by the depth images. Three-dimensional image recreation from the plurality of two-dimensional images may be performed according to any method including, but not limited to, voxel-based recreation or point-cloud-based recreation. Where a point-cloud is used, the point-cloud may be created based on the received data and then optionally converted into a triangular model.

The unmanned aerial vehicle described herein can be in the shape of an airplane (e.g. a fixed wing airplane) or a copter (e.g. multi rotor copter), i.e. a rotorcraft unmanned aerial vehicle, e.g. a quad-rotor unmanned aerial vehicle, a hex-rotor unmanned aerial vehicle, an octo-rotor unmanned aerial vehicle. The unmanned aerial vehicle described herein may include a plurality of rotors (e.g., three, four, five, six, seven, eight, or more than eight rotors), also referred to as propellers. Each of the propeller has at least one propeller blade. The propellers may be fixed pitch propellers.

According to one aspect of the disclosure, the one or more processors may be located on board each of the plurality of UAVs. Under this configuration, the one or more processors control each UAV to cause the UAV to obtain an image and to navigate with respect to the object. The one or more processors on the UAV may be controlled by one or more processors located external to the UAV for the purposes of issuing imaging commands or locational commands. For example, one or more processors located external to a UAV may transmit instructions to one or more UAVs including, but not limited to, instructions for an object location, a timing of a synchronized image, a distance from the object, or a delay following a trigger event for taking the synchronized image.

According to another aspect of the disclosure, the one or more image sensors on the UAV may be cameras. This may include cameras configured to take still images or video images. This may further include mono cameras or stereo cameras. That is, the camera may be equipped to take a two dimensional image, which will then be combined with other two-dimensional images from different vantage points to construct a three-dimensional image. Alternatively, the cameras may be a stereo camera or depth camera, which is equipped to take a three-dimensional image or image including depth information. These images with depth information may then be combined with other images to obtain a more accurate three-dimensional image or a three-dimensional image from various vantage points.

According to another aspect of the disclosure, the UAV may also include a transceiver, which is configured to transmit or receive data. This may include receiving data from a source external to the UAV, such as navigation instructions, subject identification, instructions for image taking, such as distance from the object, height with respect to the object, height with respect to the ground, or any other information that describes a relationship between the UAV and the subject. Where the transceiver is configured to connect to a radio access technology, the UAV may be configured to obtain a synchronized time from the radio access technology, such that the plurality of UAVs may operate under a synchronized clock for at least the purpose of taking a synchronized image. The transceiver may further permit the UAV to transmit one or more images to a central location following the photographing of the subject.

According to another aspect of the disclosure, instructions for photography of the subject may be delivered via the transceiver. These may be instructions for taking an image of the subject at a specific time, at a period characterized by a duration after a trigger event, or following a manual trigger event. A manual trigger event may be a trigger event caused by a remote operator, such as a pilot. The manual trigger event may be achieved by pressing a button, initiating a display, initiating a mouse, or any other manual indication of a trigger event. For example, a pilot may press a button on a joystick, a mouse button, or other button to indicate a trigger event. The plurality of UAVs will have been instructed to take an image following a buffer period. As will be described in greater detail herein, the buffer period may be a fixed time or a fixed time following the duration of a non-fixed time.

According to another aspect of the disclosure, the UAV may be equipped with a positioning circuit, which is configured to connect with a positioning system to obtain a position and/or time. The positioning circuit may be configured to connect to the Global Positioning System, wherein an absolute location of the UAV is delivered through connection to a plurality of satellites. Because the Global Positioning System is dependent on response times of signals from satellites, the Global Positioning System has a built-in mechanism for clock synchronization. The plurality of UAVs may independently connect to the Global Positioning System and thereby synchronize their clocks to the same outside standard. Synchronization via the Global Positioning System may enable synchronization among the plurality of UAVs with the tolerance of 40 ns, which is well within the range of tolerance for 3D reconstruction of images. Many 3D image reconstruction algorithms work well using photographs taken at least up to 2 ms apart, and therefore the synchronization allowed through the Global Positioning System is well within the tolerance for 3D image reconstruction.

It is anticipated that the one or more processors will include an internal clock or counter, which can be used as a synchronization clock for use in synchronizing the taking of an image. According to another aspect of the disclosure, the plurality of UAVs may be further equipped with a clock independent of the one or more processors, whereby the clock can be synchronized with clocks in the remaining plurality of UAVs for use in obtaining a synchronized image of the subject. Regardless of the type of clock used, the clock will be capable of being synchronized based on data obtained from the positioning circuit or transceiver.

Because the location of the subject may be programmed as an absolute location, the plurality of UAVs may use locational data received from the Global Positioning System to locate the subject and position themselves within a vicinity of the subject. The plurality of UAVs may be programmed with an image distance, which is a distance from the subject from which the image should be taken. For example, the one or more UAVs may be programmed with an image distance of 10 meters, whereby the swarm of UAVs will locate the subject, obtain distances 10 meters from the subject, and await a trigger event.

According to one aspect of the disclosure, the plurality of UAVs may assume a circular formation around the subject. In this case, the UAVs may be equipped with an image distance and a height. The height may be a height from the ground, a height with respect to the subject, or otherwise. If programmed with the same image distance and height, the UAVs may assume a position in a circular formation around the object, wherein the image distance is the radius of the circular formation and corresponds to the distance between the object and the UAV. Where each UAV is programmed with the same height with respect to the ground or the subject, the UAVs may be configured in a circular formation essentially within the same plane. The plane in which the UAVs are formed may, but need not, be a plane including the object. That is, if the plurality of UAVs are instructed to obtain images from a height different from the height of the subject, the plurality of UAVs will assume a plane, which does not include the subject. Where this occurs, it is anticipated that the UAVs will assume an angle which allows the one or more image sensors tasked with obtaining an image of the object to include the object within their image data. The one or more processors may be configured to calculate an angle to enable the one or more image sensors to receive image data including the subject.

According to another aspect of the disclosure, the one or more processors may be configured to determine which of the one or more image sensors will obtain image data including the subject. The selection of the one or more image sensors may be based on any criterion or criteria including, but not limited to, mounted position of the image sensor; mounted position of the image sensor relative to a location or position of the UAV; optics on the image sensor including, but not limited to, lenses, filters, or shields; image sensor capability, such as mono image capability, stereo image capability, resolution capability, a power up time, a response time, or otherwise.

Where the transceiver is configured to be connected to a radio access technology, the radio access technology may be any radio access technology but may specifically include 5G, LTE, or WLAN. This may include any future radio access technology capable of permitting an exchange of information, either between a plurality of UAVs or a UAV and one or more exterior processors. Without limitation, this may include any radio access technology approved or defined by the Next Generation Mobile Networks Alliance.

The trigger instruction may be an instruction to cause the plurality of UAVs to take an image of the subject at a predetermined duration from receipt of the trigger instruction. The predetermined duration may be an absolute duration, such as, but not limited to one second. The predetermined duration may be an instruction to take an image of the subject at the completion of a first predetermined duration expiring after receipt of the trigger instruction. For example, the first predetermined duration may be one complete second according to a clock, whereby, upon receiving the trigger instruction, the UAV begins a one-second timer upon the start of the next full second according to a clock, and the UAV takes an image of the subject upon expiration of this next full second. In more definite terms, where a processor receives a trigger instruction at a time corresponding to 100.5 seconds on a processor clock, the UAV will begin a one second timer at 101 seconds, and will take an image of the object at 102 seconds on the clock. By waiting until the beginning of a first event (such as the next full second) after receiving the trigger instruction, the one or more processors are able to account for an asynchronous receipt of the trigger instruction among the plurality of UAVs.

The trigger instruction may instruct the UAVs to take an image of the subject following a trigger event. The trigger event may be any event that is perceived by the UAVs, including, but not limited to, a flash or change in exterior light; a change in location or position of the subject; a subject's exceeding a predetermined threshold such as a maximum height, velocity, or acceleration; a change in temperature or exceeding of a temperature threshold; or a sound a particular pitch or decibel, or exceeding a decibel or pitch threshold. As in the above example, trigger instruction may cause the one or more processors to take an immediate image of the subject, or may cause the one or more processors to take an image of the subject following an expiration of a predetermined period beginning after acknowledgment of the trigger event. As in the above example, the trigger event may result in synchronous images being taken upon completion of the first full second according to the clock following recognition of the trigger event.

The trigger event may be a manual command to obtain an image of the subject. The plurality of UAVs may be monitored by one or more persons, whether directly or remotely. That is, one or more persons may be located in a vicinity of the UAVs such that the one or more persons may view of the UAVs' actions. Alternatively or additionally, one or more persons may view the UAVs remotely, through monitors, televisions, projectors, or headmounted devices. It is known to place one or more video cameras on a UAV, and one or more persons monitoring the UAVs may be provided with video feeds from the UAVs to monitor the UAV actions, or the actions of the subject. Moreover, the one or more persons may obtain access to imagery obtained by the one or more image sensors, which may then double as a camera for a still image and a video image.

The one or more persons observing the UAVs may manually initiate a trigger event. Where this occurs, the one or more persons may actuate a control, press a button, or otherwise operate a device to communicate a trigger event signal to the UAVs. For example, the one or more persons observing the UAVs may push a mouse button to communicate that a trigger event is occurring. The UAVs will receive, or have been preprogramed with, instructions for a timing of the object image relative to the trigger event signal as described above, such that the manual trigger event may cause an immediate image of the subject to be taken, or it may cause an image of the subject to be taken following the completion of a predetermined time period beginning after receipt of the trigger event.

The trigger instruction may be an instruction to take an image of the object at an absolute time. For example, the one or more UAVs may be instructed to synchronize their clocks according to the methods described herein, and then to take an image of the subject at a specific clock time. This will result in a synchronous or near synchronous image of the subject.

The trigger instruction may be an instruction to take an image of the object upon the object reaching an absolute location. Where the UAVs are equipped with a positional system, the UAVs are able to determine their own absolute position based on information received from the positioning system, such as the Global Positioning System. Using information obtained from the Global Positioning System and information obtained from one or more image sensors, the UAV may be equipped to estimate an absolute position of the object and may be calculated to take an image of the object upon the object reaching an absolute position. Estimation of the object may require depth information obtained from a depth sensing camera or depth information derived from calculation of overlap of a plurality of images from non-depth sensing cameras.

The trigger instruction may be an instruction from a master UAV. That is, a specific UAV may be designated as a master UAV wherein the master UAV is tasked with determining an occurrence of a trigger event and communicating the occurrence or instruction for taking an image to the remaining UAVs. That is, where any criterion for a trigger event has been fulfilled, the UAV may determine the occurrence of a trigger event and communicate a trigger instruction to the remaining plurality of UAVs. This communication may be performed via a radio access technology, and analog communication, a light communication, a sound communication, or otherwise.

The subject may be any point of interest whatsoever. The subject may include a person, an object, a region, an absolute location, or otherwise. According to one aspect of the disclosure, the subject may be determined by marking a map or diagram to define a point or region of interest. That is, where a map is obtained, a point, line, circle, oval, or polygon may be used to define a region of interest and therefore a subject. Where a map is three dimensional, a three-dimensional region may be used to define an area of interest and therefore a subject.

The one or more processors may be configured to maintain a predetermined distance from the subject. In this case, and upon determining the subject, the one or more processors may be required to define a predetermined distance from the subject. According to one aspect of the disclosure, the one or more processors may use data obtained from a depth sensing camera or from depth information derived from a plurality of non-depth sensing cameras to estimate a distance between the UAV and the subject, and to adjust the distance between the UAV and the subject to arrive at the predetermined distance. According to another aspect of the disclosure, the UAV may travel from the subject to a distance away from the subject to achieve the predetermined distance. That is, by tracking its position, the one or more processors can determine a distance traveled from the subject to a point away from the subject to achieve the predetermined distance. Moreover, where the absolute position of the subject is known, the one or more processors may be configured to use positional information to determine an absolute position that is the predetermined distance away from the subject. The one or more processors may also be configured to receive navigation instructions from an exterior source, causing the UAV to navigate in a direction and distance to achieve predetermined distance between the UAV and the subject. That is, under this circumstance, the UAV may not calculate its own flight plan to achieve the predetermined distance from the subject, but may rather receive flight commands from an exterior entity that performs these calculations.

The one or more processors may be configured to take an image from a predetermined height or height differential with respect to the object. That is, the one or more processors may be configured to maintain a predetermined height or altitude relative to Earth or sea, or any other acceptable baseline. The one or more processors may also be configured to maintain a height differential from the subject, such that the UAV maintains a predetermined height differential above or below the subject, which may cause the altitude of the UAV to travel in proportion to an altitude change of the subject. Where the altitude of the UAV is to be proportional or relative to a height or altitude of the subject. The UAV may be equipped to estimate the height of the subject as a basis of comparison. This may be performed with information obtained from a positioning system, such as the Global Positioning System, or relative to a known the height or altitude of the subject. Alternatively, where positional data is unavailable and the height or altitude of the subject is not known, the UAV may be configured to approach the subject and increase or decrease altitude accordingly to maintain the necessary height differential from the subject.

The plurality of UAVs may form any formation with respect to the subject. According to one aspect of the disclosure, the plurality of UAVs form a circular formation around the subject, maintaining a predetermined distance from the subject, such that the predetermined distance is the radius of the circular formation. Where this occurs, the plurality of UAVs will be constructively located in the same plane, although not necessarily in the same plane as the subject, such as where a height differential from the subject is necessary.

The plurality of UAVs may be programmed to obtain multiplanar images of the subject. That is, the plurality of UAVs may be arranged outside of a single plane, but still maintaining a predetermined distance from the subject, such that the relationship between the UAVs and the subject is defined in a plurality of planes. This may be or approximate a spherical formation. According to one aspect of the disclosure, the UAVs may obtain images from the six principal directions surrounding the subject, such as from in front of the subject, from behind the subject, from the left of the subject, from the right of the subject, from above the subject, and from below the subject. Where the subject is in contact with the earth, or otherwise located on a surface due to gravity, the images may be taken from five directions, omitting the direction from underneath.

The plurality of UAVs may be configured to equidistantly arrange themselves around the subject. For example, where the plurality of UAVs are configured to assume locations within a single plane around the subject, the number of available UAVs may be divided into 360 degrees to determine an approximate angle differential for each UAV with respect to the subject. Taking into account the predetermined distance from the subject from which the image should be taken, an approximate distance or radial distance between UAVs can be calculated. The UAVs may be configured to determine an absolute position according to this data, and to assume the absolute position based on a positioning system, such as the Global Positioning System.

The plurality of UAVs may be programmed to take into account barriers or obstructions in reaching the location from which the synchronized image is obtained. That is, a location that may correspond to a predetermined distance from the subject may be impossible due to the presence of an object in or near the location, such as where the location corresponds to a tree, a building, a mountain, or otherwise. Furthermore, the location may have a poor view of the object, due to a translucent or opaque obstruction between the UAV and the subject. In such a case, an image obtained from the UAV from this location would be undesirable, as it would provide poor quality data for 3D reconstruction. Under any of these circumstances, the UAV may be configured to calculate an alternative position for synchronous image taking. The alternative position may deviate from the intended position by either a direction or angle from the subject, or by a change in distance from the subject. For example, and without limitation, where an intended location is within a horizontal plane including the object, 10 meters from the object, and 45° from the subject with respect to a predefined axis, the UAV may select an alternative location 10 meters from the subject but according to a different angle from the subject, such as at 55° or 65°. Alternatively, the alternate location may be a location varying from the predetermined distance from the subject. According to the prior example, the alternative location may be a location at 45° from the subject, but only 9 meters from the subject. The second example is made possible by a tolerance within 3D recreation software, which is known to provide acceptable results despite certain deviations in distance from an ideal location.

According to another aspect of the disclosure, the plurality of UAVs may be configured to select the subject based on a subject's GPS location. The subject may be equipped with a portable GPS tracker, capable of deriving a GPS location and transmitting the location to one or more UAVs and/or to a centralized unit from which the one or more UAVs obtain the GPS location. The UAVs may be programmed to maintain a predetermined distance from the GPS tracker coordinates in a given form. For example, the UAVs may form a circle or a semi-circle around the GPS tracker coordinates and take one or more synchronized images from this location. Where the subject is in motion, the GPS location from the portable GPS tracker may be expected to report GPS data consistent with movement, and the UAVs may be programmed to move and maintain the predetermined distance and form in accordance with the moving GPS data. For example, a subject-skier may be equipped with a portable GPS tracker, which transmits a succession of GPS coordinates consistent with the skier's movements. The UAVs are then programmed to move and photograph accordingly, such that a distance and/or form around the skier is maintained during photography. This may permit, for example, a 360-degree view of a rapidly moving target.

The UAVs may further be configured to photograph a moving target absent a GPS tracker using technology such as object recognition or color tracking. Under such a scenario, the UAVs may be programmed to follow an object with one or more predetermined characteristics, such as shape or color. Thus, the UAVs may be programmed to follow the same skier based on a color of the skier's clothing, a shape of the skier's body and/or equipment, or otherwise.

According to another aspect of the disclosure, the UAVs may be configured to obtain a synchronized image of the subject, wherein the trigger instruction is to obtain an image upon the occurrence of a trigger event, and the trigger event is the receipt of a light signal. That is, the image sensors may be configured to function as photography slaves, such that a light signal from an external source triggers an immediate image from each of the UAVs that have received the light signal. For example, the subject may be equipped with an infrared emitter that is configured to emit a regular burst signal. Such an emitter could be attached to the subject's helmet or clothing, or any other object that would cause the emitter to locomote correspondingly to the subject. The burst of infrared light is received by the plurality of UAVs, which then triggers the UAVs to obtain an image. Additional synchronization between the UAVs may be unnecessary under these circumstances, since an infrared transmission has a low latency and thus results in a highly synchronized image by virtue of its rapid and wide distribution from the emitter to the UAVs' sensors.

Any number of unmanned aerial vehicles greater than or equal to two may be used in performing the methods described herein. The number may be selected according to the rapidity of movement, the duration of movement, the processing resources, the quality requirements of the final image data, or otherwise. According to one aspect of the disclosure, the number of unmanned aerial vehicles used herein is two. According to another aspect of the disclosure, the number of unmanned aerial vehicles used herein is greater than ten. According to another aspect of the disclosure, the number of unmanned aerial vehicles used herein is greater than twenty.

In the following, various examples are provided with reference to the aspects described above.

In Example 1, an unmanned aerial vehicle photography system is disclosed comprising at least a first unmanned aerial vehicle and a second unmanned aerial vehicle; the first unmanned aerial vehicle further comprising one or more image sensors, configured to obtain a subject image of a subject; and one or more processors, configured to cause the one or more image sensors to obtain the subject image synchronously with the second unmanned aerial vehicle.

In Example 2, the unmanned aerial vehicle photography system of Example 1 is disclosed, wherein the one or more processors are further configured to obtain the subject image according to a trigger instruction.

In Example 3, the unmanned aerial vehicle photography system of Example 2 is disclosed, wherein the first unmanned aerial vehicle further comprises a transceiver, configured to receive the trigger instruction; a positioning circuit, configured to determine a position of the first unmanned aerial vehicle; and a memory, configured to store at least one of a trigger instruction, the subject image, or a position of the first unmanned aerial vehicle.

In Example 4, the unmanned aerial vehicle photography system of any one of Examples 1 to 3 is disclosed, wherein each unmanned aerial vehicle further comprises a clock.

In Example 5, the unmanned aerial vehicle photography system of Example 4 is disclosed, wherein the clock is a clock distinct from the one or more processors.

In Example 6, the unmanned aerial vehicle photography system of Example 4 is disclosed, wherein the clock is a function of the one or more processors.

In Example 7, the unmanned aerial vehicle photography system of any one of Examples 4 through 6 is disclosed, wherein the one or more processors are configured to synchronize the clock using data obtained from the positioning circuit.

In Example 8, the unmanned aerial vehicle photography system of any one of Examples 3 through 7 is disclosed, wherein the transceiver is further configured to receive according to a radio access technology.

In Example 9, the unmanned aerial vehicle photography system of Example 8 is disclosed, wherein the Radio Access Technology is Fifth Generation Mobile Technology (5G).

In Example 10, the unmanned aerial vehicle photography system of Example 8 is disclosed, wherein the Radio Access Technology is Long Term Evolution (LTE).

In Example 11, the unmanned aerial vehicle photography system of Example 8 is disclosed, wherein the Radio Access Technology is a Wireless Local Area Network (WLAN).

In Example 12, the unmanned aerial vehicle photography system of any one of Examples 8 to 11 is disclosed, wherein the one or more processors are configured to synchronize a clock using data from the Radio Access Technology.

In Example 13, the unmanned aerial vehicle photography system of any one of Examples 2 to 12 is disclosed, wherein the trigger instruction is an instruction to obtain the subject image at a completion of a predetermined period.

In Example 14, the unmanned aerial vehicle photography system of Example 13 is disclosed, wherein the predetermined period is a first second following receipt of the trigger instruction.

In Example 15, the unmanned aerial vehicle photography system of Example 13 is disclosed, wherein the first predetermined period is a first second according to a clock, following receipt of the trigger instruction.

In Example 16, the unmanned aerial vehicle photography system of any one of Examples 2 to 12 is disclosed, wherein the trigger instruction is an instruction to obtain the subject image at a predetermined duration following a receipt of the trigger instruction.

In Example 17, the unmanned aerial vehicle photography system of any one of Examples 2 to 12 is disclosed, wherein the trigger instruction is an instruction to obtain the subject image at a predetermined duration following a trigger event.

In Example 18, the unmanned aerial vehicle photography system of Example 17 is disclosed, wherein the trigger event is a flash of light.

In Example 19, the unmanned aerial vehicle photography system of Example 17 is disclosed, wherein the trigger event is the subject reaching a predetermined height.

In Example 20, the unmanned aerial vehicle photography system of Example 17 is disclosed, wherein the trigger event is the subject exceeding a predetermined height.

In Example 21, the unmanned aerial vehicle photography system of Example 17 is disclosed, wherein the trigger event is the subject reaching a predetermined velocity.

In Example 22, the unmanned aerial vehicle photography system of Example 17 is disclosed, wherein the trigger event is the subject reaching a predetermined acceleration.

In Example 23, the unmanned aerial vehicle photography system of Example 17 is disclosed, wherein the trigger event is a manual command to obtain the subject image.

In Example 24, the unmanned aerial vehicle photography system of Example 23 is disclosed, wherein the manual command is a command transmitted by an external source.

In Example 25, the unmanned aerial vehicle photography system of any one of Examples 2 to 24 is disclosed, wherein the trigger instruction is an instruction to obtain the subject image according to a predetermined time on a synchronized clock.

In Example 26, the unmanned aerial vehicle photography system of any one of Examples 1 to 25 is disclosed, wherein the subject is an absolute position.

In Example 27, the unmanned aerial vehicle photography system of any one of Examples 1 to 25 is disclosed, wherein the subject is a position according to a Global Positioning System.

In Example 28, the unmanned aerial vehicle photography system of any one of Examples 1 to 25 is disclosed, wherein the subject is a planar region.

In Example 29, the unmanned aerial vehicle photography system of any one of Examples 1 to 25 is disclosed, wherein the subject is a three-dimensional region.

In Example 30, the unmanned aerial vehicle photography system of any one of Examples 1 to 25 is disclosed, wherein the subject is an object.

In Example 31, the unmanned aerial vehicle photography system of any one of Examples 1 to 25 is disclosed, wherein the subject is a person.

In Example 32, the unmanned aerial vehicle photography system of any one of Examples 1 to 31 is disclosed, wherein the one or more processors are further configured to cause the one or more image sensors to obtain the subject image from a height equal to a height of the subject.

In Example 33, the unmanned aerial vehicle photography system of any one of Examples 1 to 31 is disclosed, wherein the one or more processors are further configured to cause the one or more image sensors to obtain the subject image from an altitude that is a predetermined height differential from a height of the subject.

In Example 34, the unmanned aerial vehicle photography system of any one of Examples 1 to 33 is disclosed, wherein the one or more processors are further configured to cause the one or more image sensors to obtain the subject image from a predetermined distance from the subject.

In Example 35, the unmanned aerial vehicle photography system of Example 34 is disclosed, wherein a plurality of unmanned aerial vehicles are configured to obtain a synchronous subject image from a plurality of positions within a plane that includes the subject.

In Example 36, the unmanned aerial vehicle photography system of any one of Examples 1 to 33 is disclosed, wherein the one or more processors are further configured to cause one or more image sensors to obtain the subject image from a predetermined radius from the subject.

In Example 37, the unmanned aerial vehicle photography system of any one of Examples 1 to 36 is disclosed, wherein the subject is specified by a region on a map or image.

In Example 38, the unmanned aerial vehicle photography system of any one of Examples 1 to 37 is disclosed, wherein a plurality of unmanned aerial vehicles are configured to obtain the subject image from positions equidistant from the subject.

In Example 39, a method of unmanned aerial vehicle photography is disclosed comprising identifying a subject for a synchronous image; causing a first unmanned aerial vehicle and a second unmanned aerial vehicle to synchronously obtain a subject image of the subject.

In Example 40, the method of unmanned aerial vehicle photography of Example 39 is disclosed, further comprising obtaining the subject image according to a trigger instruction.

In Example 41, the method of unmanned aerial vehicle photography of Example 40 is disclosed, further comprising a receiving a transmission of the trigger instruction;

determining a position of the first unmanned aerial vehicle; and storing in a memory at least one of a trigger instruction, the subject image, or a position of the first unmanned aerial vehicle.

In Example 42, the method of unmanned aerial vehicle photography of any one of Examples 39 through 41 is disclosed, further comprising synchronizing a clock between at least the first unmanned aerial vehicle and the second unmanned aerial vehicle.

In Example 43, the method of unmanned aerial vehicle photography of Example 42 is disclosed, further comprising synchronizing the clock using data obtained from a positioning system.

In Example 44, the method of unmanned aerial vehicle photography of Example 42 is disclosed, further comprising synchronizing the clock using data obtained from a radio access technology.

In Example 45, the method of unmanned aerial vehicle photography of any one of Examples 40 through 44 is disclosed, further comprising receiving the image instruction using a radio access technology.

In Example 46, the method of unmanned aerial vehicle photography of Example 45 is disclosed, wherein the Radio Access Technology is Fifth Generation Mobile Technology (5G).

In Example 47, the method of unmanned aerial vehicle photography of Example 45 is disclosed, wherein the Radio Access Technology is Long Term Evolution (LTE).

In Example 48, the method of unmanned aerial vehicle photography of Example 45 is disclosed, wherein the Radio Access Technology is a Wireless Local Area Network (WLAN).

In Example 49, the method of unmanned aerial vehicle photography of any one of Examples 39 to 48 is disclosed, further comprising synchronizing a clock using data from the Radio Access Technology.

In Example 50, the method of unmanned aerial vehicle photography of any one of Examples 40 to 49 is disclosed, wherein the trigger instruction is an instruction to obtain the subject image at a completion of a predetermined period.

In Example 51, the method of unmanned aerial vehicle photography of Example 50 is disclosed, wherein the predetermined period is a first second following receipt of the trigger instruction.

In Example 52, the method of unmanned aerial vehicle photography of Example 51 is disclosed, wherein the first predetermined period is a first second according to a clock, following receipt of the trigger instruction.

In Example 53, the method of unmanned aerial vehicle photography of any one of Examples 39 to 49 is disclosed, wherein the trigger instruction is an instruction to obtain the subject image at a predetermined duration following a receipt of the trigger instruction.

In Example 54, the method of unmanned aerial vehicle photography of any one of Examples 39 to 49 is disclosed, wherein the trigger instruction is an instruction to obtain the subject image at a predetermined duration following a trigger event.

In Example 55, the method of unmanned aerial vehicle photography of Example 54 is disclosed, wherein the trigger event is a flash of light.

In Example 56, the method of unmanned aerial vehicle photography of Example 54 is disclosed, wherein the trigger event is the subject reaching a predetermined height.

In Example 57, the method of unmanned aerial vehicle photography of Example 54 is disclosed, wherein the trigger event is the subject exceeding a predetermined height.

In Example 58, the method of unmanned aerial vehicle photography of Example 54 is disclosed, wherein the trigger event is the subject reaching a predetermined velocity.

In Example 59, the method of unmanned aerial vehicle photography of Example 54 is disclosed, wherein the trigger event is the subject reaching a predetermined acceleration.

In Example 60, the method of unmanned aerial vehicle photography of Example 54 is disclosed, wherein the trigger event is a manual command to obtain the subject image.

In Example 61, the method of unmanned aerial vehicle photography of Example 60 is disclosed, wherein the manual command is a command transmitted by an external source.

In Example 62, the method of unmanned aerial vehicle photography of any one of Examples 40 to 61 is disclosed, wherein the trigger instruction is an instruction to obtain the subject image according to a predetermined time on a synchronized clock.

In Example 63, the method of unmanned aerial vehicle photography of any one of Examples 39 to 62 is disclosed, wherein the subject is an absolute position.

In Example 64, the method of unmanned aerial vehicle photography of any one of Examples 39 to 62 is disclosed, wherein the subject is a position according to a Global Positioning System.

In Example 65, the method of unmanned aerial vehicle photography of any one of Examples 39 to 62 is disclosed, wherein the subject is a planar region.

In Example 66, the method of unmanned aerial vehicle photography of any one of Examples 39 to 62 is disclosed, wherein the subject is a three-dimensional region.

In Example 67, the method of unmanned aerial vehicle photography of any one of Examples 39 to 62 is disclosed, wherein the subject is an object.

In Example 68, the method of unmanned aerial vehicle photography of any one of Examples 39 to 62 is disclosed, wherein the subject is a person.

In Example 69, the method of unmanned aerial vehicle photography of any one of Examples 39 to 68 is disclosed, further comprising obtaining the subject image from a height equal to a height of the subject.

In Example 70, the method of unmanned aerial vehicle photography of any one of Examples 39 to 68 is disclosed, further comprising obtaining the subject image from an altitude that is a predetermined height differential from a height of the subject.

In Example 71, the method of unmanned aerial vehicle photography of any one of Examples 39 to 68 is disclosed, further comprising obtaining the subject image from a predetermined distance from the subject.

In Example 72, the method of unmanned aerial vehicle photography of Example 71 is disclosed, further comprising the first unmanned aerial vehicle and the second unmanned aerial vehicle obtaining a synchronous subject image from a plurality of positions within a plane that includes the subject.

In Example 73, the method of unmanned aerial vehicle photography of any one of Examples 39 to 72 is disclosed, further comprising obtaining the subject image from a predetermined radius from the subject.

In Example 74, the method of unmanned aerial vehicle photography of any one of Examples 39 to 73 is disclosed, further comprising specifying a region on a map or image.

In Example 75, the method of unmanned aerial vehicle photography of any one of Examples 39 to 74 is disclosed, further comprising obtaining the subject image from a plurality of positions equidistant from the subject.

In Example 76, a means for unmanned aerial vehicle photography is disclosed comprising at least a first unmanned aerial vehicle and a second unmanned aerial vehicle; the first unmanned aerial vehicle further comprising one or more image sensing means, configured to obtain a subject image of a subject; and one or more processing means, configured to cause the one or more image sensing means to obtain the subject image synchronously with a second unmanned aerial vehicle.

In Example 77, the means for unmanned aerial vehicle photography of Example 76 is disclosed, wherein the one or more processing means are further configured to obtain the subject image according to a trigger instruction.

In Example 78, the means for unmanned aerial vehicle photography of Example 76 is disclosed, wherein the first unmanned aerial vehicle further comprises a transceiving means, configured to receive the trigger instruction; a positioning means, configured to determine a position of the first unmanned aerial vehicle; and a storage means, configured to store at least one of a trigger instruction, the subject image, or a position of the first unmanned aerial vehicle.

In Example 79, the means for unmanned aerial vehicle photography of any one of Examples 76 to 78 is disclosed, wherein each unmanned aerial vehicle further comprises a timekeeping means.

In Example 80, the means for unmanned aerial vehicle photography of Example 79 is disclosed, wherein the timekeeping means is a timekeeping means distinct from the one or more processing means.

In Example 81, the means for unmanned aerial vehicle photography of Example 79 is disclosed, wherein the timekeeping means is a function of the one or more processing means.

In Example 82, the means for unmanned aerial vehicle photography of any one of Examples 79 through 81 is disclosed, wherein the one or more processing means are configured to synchronize the timekeeping means using data obtained from the positioning means.

In Example 83, the means for unmanned aerial vehicle photography of any one of Examples 78 through 82 is disclosed, wherein the transceiving means is further configured to receive according to a radio access technology.

In Example 84, the means for unmanned aerial vehicle photography of Example 83 is disclosed, wherein the Radio Access Technology is Fifth Generation Mobile Technology (5G).

In Example 85, the means for unmanned aerial vehicle photography of Example 83 is disclosed, wherein the Radio Access Technology is Long Term Evolution (LTE).

In Example 86, the means for unmanned aerial vehicle photography of Example 83 is disclosed, wherein the Radio Access Technology is a Wireless Local Area Network (WLAN).

In Example 87, the means for unmanned aerial vehicle photography of any one of Examples 83 to 86 is disclosed, wherein the one or more processing means are configured to synchronize a timekeeping means using data from the Radio Access Technology.

In Example 88, the means for unmanned aerial vehicle photography of any one of Examples 77 to 87 is disclosed, wherein the trigger instruction is an instruction to obtain the subject image at a completion of a predetermined period.

In Example 89, the means for unmanned aerial vehicle photography of Example 88 is disclosed, wherein the predetermined period is a first second following receipt of the trigger instruction.

In Example 90, the means for unmanned aerial vehicle photography of Example 88 is disclosed, wherein the first predetermined period is a first second according to a timekeeping means, following receipt of the trigger instruction.

In Example 91, the means for unmanned aerial vehicle photography of any one of Examples 77 to 87 is disclosed, wherein the trigger instruction is an instruction to obtain the subject image at a predetermined duration following a receipt of the trigger instruction.

In Example 92, the means for unmanned aerial vehicle photography of any one of Examples 77 to 87 is disclosed, wherein the trigger instruction is an instruction to obtain the subject image at a predetermined duration following a trigger event.

In Example 93, the means for unmanned aerial vehicle photography of Example 92 is disclosed, wherein the trigger event is a flash of light.

In Example 94, the means for unmanned aerial vehicle photography of Example 92 is disclosed, wherein the trigger event is the subject reaching a predetermined height.

In Example 95, the means for unmanned aerial vehicle photography of Example 92 is disclosed, wherein the trigger event is the subject exceeding a predetermined height.

In Example 96, the means for unmanned aerial vehicle photography of Example 92 is disclosed, wherein the trigger event is the subject reaching a predetermined velocity.

In Example 97, the means for unmanned aerial vehicle photography of Example 92 is disclosed, wherein the trigger event is the subject reaching a predetermined acceleration.

In Example 98, the means for unmanned aerial vehicle photography of Example 92 is disclosed, wherein the trigger event is a manual command to obtain the subject image.

In Example 99, the means for unmanned aerial vehicle photography of Example 98 is disclosed, wherein the manual command is a command transmitted by an external source.

In Example 100, the means for unmanned aerial vehicle photography of any one of Examples 77 to 99 is disclosed, wherein the trigger instruction is an instruction to obtain the subject image according to a predetermined time on a synchronized timekeeping means.

In Example 101, the means for unmanned aerial vehicle photography of any one of Examples 76 to 100 is disclosed, wherein the subject is an absolute position.

In Example 102, the means for unmanned aerial vehicle photography of any one of Examples 76 to 100 is disclosed, wherein the subject is a position according to a Global Positioning System.

In Example 103, the means for unmanned aerial vehicle photography of any one of Examples 76 to 100 is disclosed, wherein the subject is a planar region.

In Example 104, the means for unmanned aerial vehicle photography of any one of Examples 76 to 100 is disclosed, wherein the subject is a three-dimensional region.

In Example 105, the means for unmanned aerial vehicle photography of any one of Examples 76 to 100 is disclosed, wherein the subject is an object.

In Example 106, the means for unmanned aerial vehicle photography of any one of Examples 76 to 100 is disclosed, wherein the subject is a person.

In Example 107, the means for unmanned aerial vehicle photography of any one of Examples 76 to 106 is disclosed, wherein the one or more processing means are further configured to cause the one or more image sensing means to obtain the subject image from a height equal to a height of the subject.

In Example 108, the means for unmanned aerial vehicle photography of any one of Examples 76 to 106 is disclosed, wherein the one or more processing means are further configured to cause the one or more image sensing means to obtain the subject image from an altitude that is a predetermined height differential from a height of the subject.

In Example 109, the means for unmanned aerial vehicle photography of any one of Examples 76 to 108 is disclosed, wherein the one or more processing means are further configured to cause the one or more image sensing means to obtain the subject image from a predetermined distance from the subject.

In Example 110, the means for unmanned aerial vehicle photography of Example 109 is disclosed, wherein a plurality of unmanned aerial vehicles are configured to obtain a synchronous subject image from a plurality of positions within a plane that includes the subject.

In Example 111, the means for unmanned aerial vehicle photography of any one of Examples 76 to 108 is disclosed, wherein the one or more processing means are further configured to cause one or more image sensing means to obtain the subject image from a predetermined radius from the subject.

In Example 112, the means for unmanned aerial vehicle photography of any one of Examples 76 to 111 is disclosed, wherein the subject is specified by a region on a map or image.

In Example 113, the means for unmanned aerial vehicle photography of any one of Examples 76 to 112 is disclosed, wherein a plurality of unmanned aerial vehicles are configured to obtain the subject image from positions equidistant from the subject.

In Example 114, a non-transient computer readable medium configured to perform the method of any one of Examples 39 to 77 is disclosed.

In Example 115, the unmanned aerial vehicle photography system of Example 3 is disclosed, wherein the transceiver is further configured to receive a transmission of a position of the subject, and the at least first unmanned aerial vehicle and second unmanned aerial vehicle are configured to obtain a synchronized subject image of the subject from a predetermined distance from the position of the subject.

In Example 115, the unmanned aerial vehicle photography system of Example 17 is disclosed, wherein the trigger event is the receipt of an infrared light emission. While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. An unmanned aerial vehicle photography system comprising at least a first unmanned aerial vehicle and a second unmanned aerial vehicle;
    the first unmanned aerial vehicle further comprising:
        one or more image sensors, configured to detect sensor data representing a subject; and
        one or more processors, configured to
            determine from the sensor data an occurrence of a trigger event;
            instruct the one or more image sensors to obtain a subject image synchronously with the second unmanned aerial vehicle at a conclusion of a fixed time duration following a non-fixed time duration;
            wherein the non-fixed time duration is an unmanned aerial vehicle-specific time duration beginning with the determination of the trigger event and ending with a beginning of a recurring fixed time interval, and wherein the fixed time duration is a duration from the beginning of the recurring fixed time internal to an end of the recurring fixed time interval.

2. The unmanned aerial vehicle photography system of claim 1, wherein each unmanned aerial vehicle further comprises a clock, wherein the clock is a function of the one or more processors, and wherein the one or more processors are configured to synchronize the clock using data obtained from the positioning circuit.

3. The unmanned aerial vehicle photography system of claim 1, wherein the transceiver is further configured to receive a transmission of a position of the subject, and the at least first unmanned aerial vehicle and second unmanned aerial vehicle are configured to obtain a synchronized subject image of the subject from a predetermined distance from the position of the subject.

4. The unmanned aerial vehicle photography system of claim 1, wherein the trigger event is a flash of light.

5. The unmanned aerial vehicle photography system of claim 1, wherein the trigger event is the receipt of an infrared light emission.

6. The unmanned aerial vehicle photography system of claim 1, wherein the one or more processors are further configured to cause the one or more image sensors to obtain the subject image from a predetermined distance from the subject.

7. The unmanned aerial vehicle photography system of claim 1, wherein the one or more processors of the first unmanned aerial vehicle are further configured to:
    receive from the one or more image sensors, image data representing the subject image;
    detect a predetermined characteristic within the image sensor data;
    control the first unmanned aerial vehicle to follow the subject based on a detected position of the predetermined characteristic.

8. The unmanned aerial vehicle photography system of claim 1, wherein the trigger event is the subject reaching at least one of a predetermined velocity or a predetermined acceleration.

9. The unmanned aerial vehicle photography system of claim 1, wherein the one or more processors of the first unmanned aerial vehicle are synchronized with one or more processors of the second unmanned aerial vehicle.

10. The unmanned aerial vehicle photography system of claim 1, wherein the trigger event is the subject reaching at predetermined height.

11. A non-transitory computer readable medium comprising instructions which, if executed, cause one or more processors to:
    determine from sensor data representing a subject, an occurrence of a trigger event; and
    instruct one or more image sensors to obtain an image of the subject at a conclusion of a fixed time duration following a non-fixed time duration;
    wherein the non-fixed time duration is a time duration beginning with the determination of the trigger event and ending with a beginning of a recurring fixed time interval, and wherein the fixed time duration is a duration from the beginning of the recurring fixed time internal to an end of the recurring fixed time interval.

12. The non-transitory computer readable medium of claim 11, wherein the trigger event is the determination that the subject has reached at least one of a predetermined velocity or a predetermined acceleration.

13. The non-transitory computer readable medium of claim 11, wherein the trigger event is a flash of light.

14. The non-transitory computer readable medium of claim 11, wherein the trigger event is an infrared light emission.

15. One or more processors, configured to:
    determine from sensor data representing a subject, an occurrence of a trigger event; and
    instruct one or more image sensors to obtain an image of the subject at a conclusion of a fixed time duration following a non-fixed time duration;

wherein the non-fixed time duration is an unmanned aerial vehicle-specific time duration beginning with the determination of the trigger event and ending with a beginning of a recurring fixed time interval, and wherein the fixed time duration is a duration from the beginning of the recurring fixed time internal to an end of the recurring fixed time interval.

16. The one or more processors of claim 15, wherein the trigger event is the determination that the subject has reached at least one of a predetermined velocity or a predetermined acceleration.

17. The one or more processors of claim 15, wherein the trigger event is a flash of light.

18. The one or more processors of claim 15, wherein the trigger event is an infrared light emission.

* * * * *